US011294754B2

(12) United States Patent
Xu et al.

(10) Patent No.: US 11,294,754 B2
(45) Date of Patent: Apr. 5, 2022

(54) SYSTEM AND METHOD FOR CONTEXTUAL EVENT SEQUENCE ANALYSIS

(71) Applicant: NEC Laboratories America, Inc., Princeton, NJ (US)

(72) Inventors: Jianwu Xu, Titusville, NJ (US); Hui Zhang, Princeton Junction, NJ (US); Haifeng Chen, West Windsor, NJ (US); Tanay Kumar Saha, Indianapolis, IN (US)

(73) Assignee: NEC Corporation

( * ) Notice: Subject to any disclaimer, the term of this patent is extended or adjusted under 35 U.S.C. 154(b) by 643 days.

(21) Appl. No.: 16/200,950

(22) Filed: Nov. 27, 2018

(65) Prior Publication Data

US 2019/0163552 A1 May 30, 2019

Related U.S. Application Data

(60) Provisional application No. 62/591,280, filed on Nov. 28, 2017.

(51) Int. Cl.
*G06F 11/00* (2006.01)
*G06F 11/07* (2006.01)
*G06N 20/10* (2019.01)

(52) U.S. Cl.
CPC ........ *G06F 11/079* (2013.01); *G06F 11/0751* (2013.01); *G06F 11/0778* (2013.01); *G06F 11/0787* (2013.01); *G06F 11/0793* (2013.01); *G06N 20/10* (2019.01)

(58) Field of Classification Search
CPC ............ G06F 11/3466; G06F 11/3471; G06F 11/3476; G06F 11/348; G06F 11/0709; G06F 11/079; G06F 11/0751; G06F 11/0778; G06F 11/0787; G06F 11/0793; H04L 41/16; H04L 41/0631; H04L 41/069; H04L 41/145
USPC .................................................... 714/1–57
See application file for complete search history.

(56) References Cited

U.S. PATENT DOCUMENTS

| | | | | |
|---|---|---|---|---|
| 2003/0061550 A1* | 3/2003 | Ng | ....................... | G06F 11/3664 714/45 |
| 2003/0121027 A1* | 6/2003 | Hines | ..................... | G06F 11/362 717/135 |
| 2003/0149675 A1* | 8/2003 | Ansari | ............... | H04N 21/4751 706/2 |
| 2009/0049338 A1* | 2/2009 | Unnikrishnan | .... | G05B 23/0281 714/26 |
| 2011/0276828 A1* | 11/2011 | Tamaki | .............. | G05B 23/0254 714/26 |

(Continued)

OTHER PUBLICATIONS

Hamooni, Hossein, et al. "LogMine: fast pattern recognition for log analytics," Proceedings of the 25th ACM International on Conference on Information and Knowledge Management, ACM, Oct. 2016, 10 pages.

(Continued)

*Primary Examiner* — Sarai E Butler
(74) *Attorney, Agent, or Firm* — Joseph Kolodka (57) ABSTRACT

Systems and methods for contextual event sequence analysis of system failure that analyzes heterogeneous system event record logs are disclosed. The disclosure relates to analyzing event sequences for system failure in ICT and other computerized systems and determining their causes and propagation chains.

20 Claims, 7 Drawing Sheets

(56) References Cited

U.S. PATENT DOCUMENTS

| | | | |
|---|---|---|---|
| 2013/0318072 A1* | 11/2013 | Ohta | G06F 16/3331 707/722 |
| 2014/0122932 A1* | 5/2014 | Chen | G06F 11/0706 714/37 |
| 2015/0309854 A1* | 10/2015 | Fradkin | G06F 11/079 714/47.3 |
| 2015/0355322 A1* | 12/2015 | Oshima | G01S 13/46 342/116 |
| 2016/0124792 A1* | 5/2016 | Togawa | G06F 11/079 714/37 |
| 2017/0085929 A1* | 3/2017 | Arpteg | G06F 16/783 |
| 2017/0293516 A1* | 10/2017 | Baca | G06F 11/0706 |
| 2018/0006900 A1* | 1/2018 | Korycki | H04L 41/064 |
| 2018/0129733 A1* | 5/2018 | Chandrasekaran | G06F 16/3344 |
| 2018/0270261 A1* | 9/2018 | Pande | H04L 63/1425 |
| 2018/0329884 A1* | 11/2018 | Xiong | G06N 3/0445 |

OTHER PUBLICATIONS

Yu, Xiao, et al. "Cloudseer: Workflow monitoring of cloud infrastructures via interleaved logs," ACM SIGPLAN Notices, ACM, Mar. 2016, pp. 489-502, vol. 51 No. 4.

Ning, Xia, et al. "HLAer: a System for Heterogeneous Log Analysis," SDM Workshop on Heterogeneous Learning, 2014, pp. 1-22.

Li, Zhenhui, et al. "eperiodicity: Mining event periodicity from incomplete observations," IEEE Transactions on Knowledge and Data Engineering, May 2015, pp. 1219-1232, vol. 27 No. 5.

Perozzi, Bryan, et al. "Deepwalk: Online learning of social representations," Proceedings of the 20th ACM SIGKDD International conference on Knowledge discovery and data mining, ACM, Aug. 2014, 10 pages.

Mikolov, Tomas, et al. "Distributed representations of words and phrases and their compositionality," Advances in neural information processing systems, 2013, 9 pages.

Ester, Martin, et al. "A density-based algorithm for discovering clusters in large spatial databases with noise," KDD-96 Proceedings, Aug. 1996, pp. 226-231, vol. 96 No. 34, AAAI Press.

Rousseeuw, Peter J. "Silhouettes: a graphical aid to the interpretation and validation of cluster analysis," Journal of computational and applied mathematics, Nov. 1987, pp. 53-65, vol. 20.

Toshibia GridData Event Pattern Analytics: http://www.toshiba.co.jp/cl/pro/bigdatapf/lineup/GridData/epa.htm. Accessed on Nov. 16, 2018.

OpenStack cloud computing management software: https://www.openstack.org. Accessed on Sep. 20, 2018.

* cited by examiner

SYSTEM AND METHOD FOR CONTEXTUAL EVENT SEQUENCE ANALYSIS

RELATED APPLICATION INFORMATION

This application claims priority to U.S. Provisional Patent Application No. 62/591,280, filed on Nov. 28, 2017, incorporated herein by reference in its entirety.

BACKGROUND

Technical Field

The present invention relates to analyzing event sequence, and more particularly to Information and Communication Technology systems and manufacturing plant systems with computer software logging utilities or physical sensors.

Description of the Related Art

As various multi-component electronic systems become more prevalent, they often increase in complexity along with the ways of monitoring their performance and ensuring that they operate smoothly. Many electronic and computerized systems record and keep logs of various system events.

When failures or faults occur within a system, these logs can sometimes be used to discover the potential root cause of the failure or fault and to see how failure or fault propagates to or through the various components of the system. Identifying the initial cause and propagation path of such a fault or failure can help system operators and administrators locate a faulty component, understand the failure mechanism, and/or devise mitigation solutions to reduce or eliminate the failures. Therefore, fault diagnosis is an important aspect of optimal system management helping achieve minimal downtime.

SUMMARY

According to an embodiment of the present invention, a computerized system is provided for contextual event sequence analysis of system failure includes a processor device and a memory device operatively coupled to the processor device where the memory device is configured to serve as an event record log source including digital event record logs. The processor device is configured to execute program code stored on the memory device to extract patterns from event records (e.g., event sequence records) using an event pattern extractor, generate an event corpus from the extracted event patterns using an event identifier corpus generator, execute a machine learning algorithm to learn encoded latent representations of sequences of event types using a vector encoder coupled to the corpus generator, generate automaton models of events ordered based on a context of events obtained from the retrieved event records for the clusters using an automaton generator, and identify issues in the operation of a system using the automaton models. The identified issues are resolved by locating the source of each issue and preventing the propagation of the issues through the system.

According to another embodiment of the present invention, a computer program product is manufactured with a non-transitory computer readable medium including instructions executable by a computerized system instructing the system to identify patterns within event record logs wherein a pattern represents a type of event, generate a corpus of event types, encode latent representations of event type sequences, learn latent representations of event type sequences, generate clusters of failure event types, and generate an automaton model based on a context of events obtained from retrieved event records for each of failure event types. The instructions can instruct the system to sort or order a plurality of automaton models to identify issues in the operation of a system using the automaton models. The issues are resolved by locating the source of each issue and preventing the propagation of the issues through the system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Various embodiments of the present invention are directed to a system and method for contextual event sequence analysis of system failure that analyzes heterogeneous system event record logs to help pinpoint the causes of system faults and failures and track their spread through the system's components through time during different phases of the system's operation. Embodiments described herein present methods for system failure diagnosis based on a contextual analysis of event records representing the system's normal operation and its abnormal operations. By extracting event sequences and forming multiple sequence automata models to describe system failure event evolution, the embodiments of the present invention help system administrators understand and diagnose failures.

Systems such as Information and Communication Technology ("ICT") systems, manufacturing plant systems, computer software logging utilities, and interlinked physical sensor systems, among a variety of others, often generate and record sets of logs of discrete system events, statuses, and/or states (each of such events, statuses, and/or states referred to individually as an "event" and, collectively, as "events"). These logs are useful for tracking system operation and performance as well as for troubleshooting and investigating system failures and faults because the discrete event records usually include time stamps along with the descriptions of the events to which they pertain. However, due to the sheer volume and variety of such event record logs it is often difficult and impractical for system operators/administrators to go through them manually to find the origins of system malfunctions and the propagation of faults through the system.

The methods incorporated in the embodiments of the present invention employ, among other things, natural language processing and deep learning techniques. Given a set of discrete event records, the certain embodiments first generate an event corpus (including information regarding normal system events and system events indicative of abnormal system operation) based on a deep walk technique. In some embodiments of the invention, the event corpus includes multiple event sequences that are analogous to natural language sentences where each event record in a sequence is analogous to a word. From the corpus, the various embodiments of the invention can employ a pattern-to-vector encoding method for latent representation learning of event sequences by projecting each discrete event as a vector into an embedded metric space. The learned latent representations of event sequences can then be used to cluster multiple event records into different groups. An automaton model is constructed for each group by embodiments of the present invention and identified as an explanation for or cause of some aspect of a system fault or failure. In an embodiment of the present invention, multiple automata are ordered based on time stamp information to form a complete picture of how a fault propagates through time and across different components. In this manner, the embodiments of the present invention are able to address the aforementioned problems arising during discrete event fault diagnosis by being compatible with event records of different types and formats and considering contextual information and temporal relationships in the analysis.

It should be noted that the features illustrated in the drawings are not necessarily drawn to scale, and features of one embodiment can be employed with other embodiments as the skilled artisan would recognize, even if not explicitly stated herein. Descriptions of well-known components and processing techniques may be omitted so as to not unnecessarily obscure the embodiments.

Various features may be described as being optional, for example, through the use of the verbs "can" or "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Any and all functions of the various embodiments of the present invention described herein can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

As described in more detail below, some embodiments of the present invention can be wholly contained within a single computing device. Other embodiments however, can encompass a plurality of interconnected or networked devices and resources.

Figure 1:
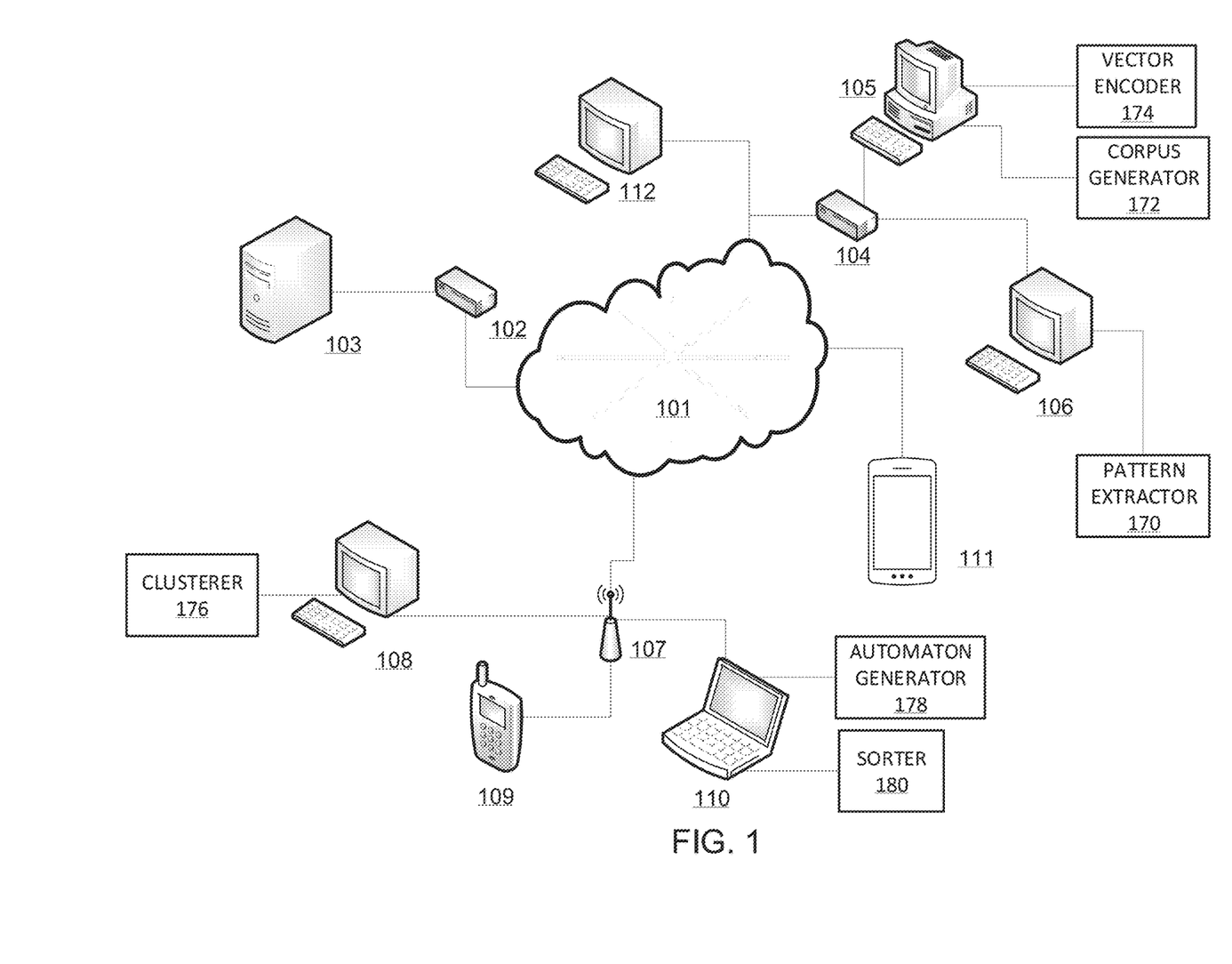
FIG. 1 is a schematic overview of a system in accordance with the present invention.

Referring to FIG. 1, a schematic overview of a system in accordance with an embodiment of the present disclosure is shown in the context of an ICT system. The system can include one or more application servers 103 for electronically storing information used by the system. Applications in the server 103 can retrieve and manipulate information in storage devices and exchange information through a Wide Area Network ("WAN") 101 (e.g., a set of interconnected local area networks, a set of interconnected metropolitan area networks, or the Internet). Applications in server 103 can also be used to manipulate information stored remotely and process and analyze data stored remotely across a WAN 101.

According to an exemplary embodiment, as shown in FIG. 1, exchange of information through WAN 101 or another network can occur through one or more high speed connections. In some cases, high speed connections can be over-the-air, passed through networked systems, directly connected to one or more WANs 101, or directed through one or more routers 102. Router(s) 102 are optional and other embodiments in accordance with the present disclosure can employ no routers 102, one router 102, or a plurality of routers 102. One of ordinary skill in the art would appreciate that there are numerous ways server 103 can connect to WAN 101 for the exchange of information, and embodiments of the present disclosure are contemplated for use with any method for connecting to networks for the purpose of exchanging information. Further, while this application refers to high speed connections, embodiments of the present disclosure can be employed with connections of any speed.

In the various embodiments, components or modules of the system can connect to server 103 via WAN 101 or other network in numerous ways. For instance, a component or module can connect to the system through a computing device 112 directly connected to the WAN 101, through a computing device 105, 106 connected to the WAN 801 through a routing device 104, through a computing device 108, 109, 110 connected to a wireless access point 107, through a computing device 111 via a wireless connection (e.g., CDMA, GMS, 3G, 4G) to the WAN 101, etc. One of ordinary skill in the art will appreciate that there are numerous ways that a component or module can connect to server 103 via WAN 101 or other network, and embodiments of the present disclosure are contemplated for use with any method for connecting to server 103 via WAN 101 or other network.

Furthermore, server 103 could be a personal computing device, such as a smartphone 111, acting as a host for other computing devices to connect to. In accordance with some embodiments of the present invention an event log source can be a networked device, including, but not limited to, server 103 or computing device 108, which includes a memory device. In some exemplary embodiments of the system, as described in more detail below, each of an event pattern extractor 170, an event identifier sequence corpus generator 172, a vector encoder 174, an event type sequence clusterer 176, an automaton generator 178, and a sorter 180 can be respectively embodied by a separate computing device such as laptop 810, smartphone 811, or server 803.

For example, a server 103 can include a processor device coupled to a memory device configured to record and serve event record logs generated by an ICT system. Computing device 106 can include an event pattern extractor 170 configured to receive event records (e.g., event sequence records) from server 103 through WAN 101. Both of an event identifier corpus generator 172 and a vector encoder 174 can be communicably coupled to each other and, in one exemplary embodiment, included in computing device 105 wherein the corpus generator 172 is also communicably coupled to the event pattern extractor 170 and the vector encoder 174 is configured to execute a machine learning algorithm. In some embodiments, computing device 108 can include an event type sequence clusterer 176 communicably coupled, through WAN 101 or access point 107, to computing device 110 which can include both of an automaton generator 178 and a sorter 180 as well as a display means (e.g., a screen). Alternatively, in other embodiments, such as the ones described in more detail below, the abovementioned elements can all be included together entirely within one of such exemplary computing devices. It should be understood by those skilled in the art that the aforementioned elements can be distributed in various combinations among the devices and components depicted in FIG. 1 and that all such combinations are contemplated hereby without departing from the scope of the disclosure of the present invention.

Figure 2:
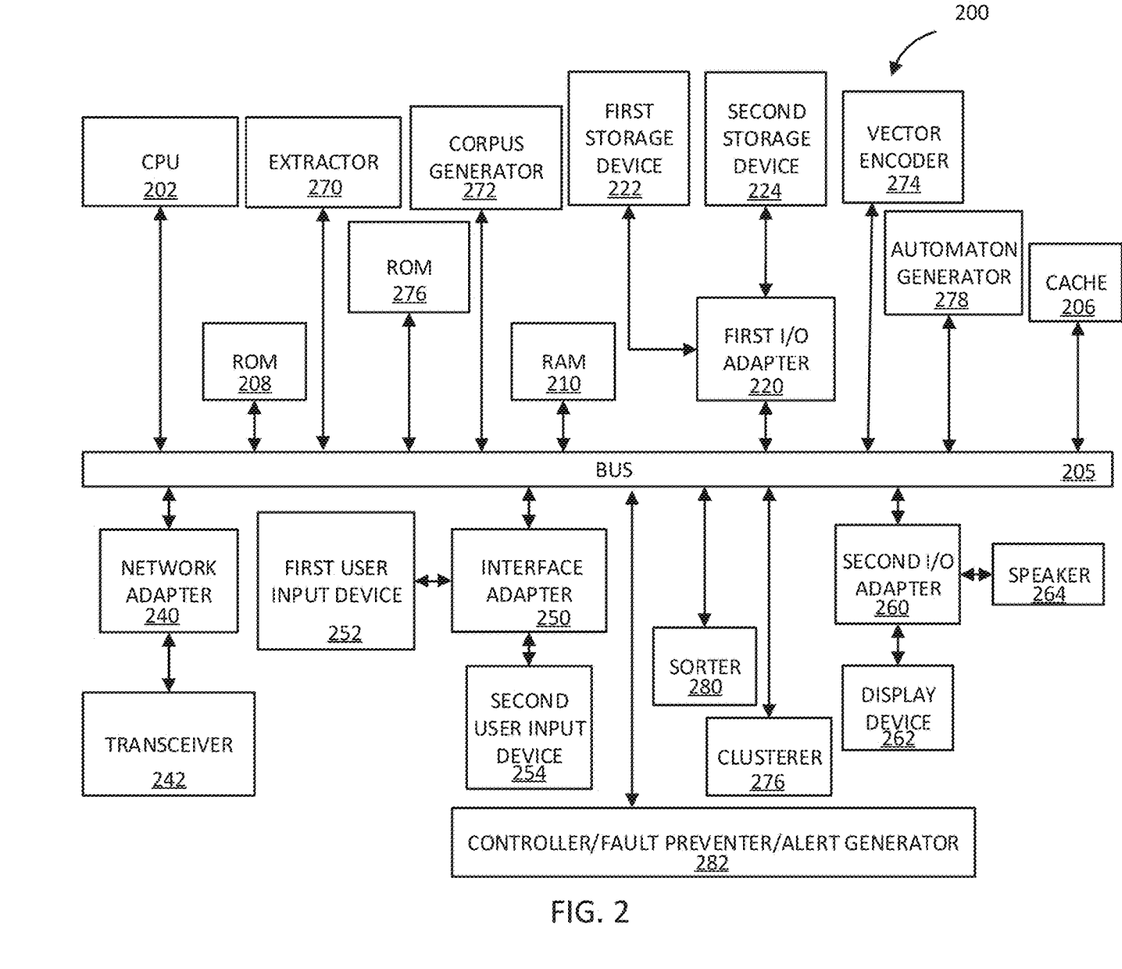
FIG. 2 is a block diagram illustrating a computing device in accordance with an embodiment of the present invention.

Turning to FIG. 2, an exemplary processing system 200 to which the present invention can be applied is shown in accordance with one embodiment. The processing system 200 includes at least one processor device ("CPU") 202 operatively coupled to other components via a system bus 205. A cache 206, a Read Only Memory ("ROM") 208, a Random-Access Memory ("RAM") 210, a first input/output ("I/O") adapter 220, a second I/O adapter 260, a network adapter 240, and a user interface adapter 250, are operatively coupled to the system bus 205.

A first storage device 222 and a second storage device 224 are operatively coupled to system bus 205 by the first I/O adapter 220. The storage devices 222 and 224 can be any of a disk storage device (e.g., a magnetic or optical disk storage device), a solid state magnetic device, flash memory device, cloud storage device, and so forth. The storage devices 222 and 224 can be the same type of storage device or different types of storage devices.

A speaker 264 and a display device 262 are operatively coupled to system bus 205 by the second I/O adapter 260. A transceiver 242 is operatively coupled to system bus 205 by network adapter 240. A first user input device 252, and a second user input device 254 are operatively coupled to system bus 205 by user interface adapter 250. The user input devices 252 and 254 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 252 and 254 can be the same type of user input device or different types of user input devices. The user input devices 252 and 254 are used to input and output information to and from system 200.

Other embodiments of the present invention can optionally include further processing units including a graphics processing unit ("GPU"), a mother board, or alternatively/ additionally another storage medium, an operating system, one or more application software, as well as including one or more communication interfaces (e.g., RS232, Ethernet, Wifi, Bluetooth, USB). Useful examples of computing devices optionally included in or integrable with embodiments of the present invention include, but are not limited to, personal computers, smart phones, laptops, mobile computing devices, tablet PCs, and servers. In accordance with embodiments of the present invention, an event record log source can be a computer storage medium.

Various combinations of the processor device 202 and storage devices 222 and 224 coupled thereto as well as to and RAM 210 can include or be combined with any of any of a pattern extractor 270, an event identifier sequence corpus generator 272, a vector encoder 274, an event type sequence clusterer 276, and an automaton generator 278, respectively, while combinations of the processor device 202 and storage devices 222 and 224 coupled therewith as well as to RAM 210 and the display device 262 can include or be combined with the sorter 280, in accordance with the several embodiments of the present invention. In some embodiments, each of a pattern extractor 270, an event identifier sequence corpus generator 272, a vector encoder 274, an event type sequence clusterer 276, an automaton generator 278, and the sorter 280 can be coupled directly or indirectly to system bus 205 or, alternatively, be included in a storage device 222, 224.

According to some of the embodiments of the present invention, the aforementioned elements and related electronic components can be configured (e.g., via specific instructions or operative settings and parameters of its constituent elements) to perform the steps of the methods described below. More specifically, in accordance with an embodiment of the present invention an event pattern extractor 270 can be configured to receive or obtain event patterns; an event identifier sequence corpus generator 272 can be configured to generate an event corpus, a vector encoder 274 can be configured to encode and learn latent representations of event types, an event type sequence clusterer 276 can be configured to cluster event types and retain only clusters with failure event types; an automaton generator 278 can be configured to generate automata for a plurality of clusters, and sorting module 280 can be configured to order the automata in temporal order and presenting the ordered set in a visual manner via display device 262 or to emit auditory signals based on the results of the ordering via speaker 262. A controller/fault preventer/alert generator 282 connected to the system bus 205 can be employed for prevention of faults/failures, and/or for performing corrective actions (e.g., quarantine, IP blocking, power down components, cutting off communication, etc.) in accordance with various embodiments of the present invention.

A system, according to an embodiment of the present invention, includes a processor device 202, a memory device 210 coupled to the processor device 202 and also configured to serve as an event record log source including digital event record logs, an event pattern extractor 270 coupled to the memory device 210 and configured to receive event records (e.g., event sequence records) from the event record log source, an event identifier sequence corpus generator 272 coupled to the event pattern extractor 270, a vector encoder 274 coupled to the corpus generator 272 and configured to execute a machine learning algorithm, an event type sequence clusterer 276 coupled to each of the pattern extractor 270 and the vector encoder 274, an automaton generator 278 coupled to the clusterer 276, and a sorter 280 coupled to the automaton generator 278. In this embodiment as well as other embodiments, each of a pattern extractor 270, an event identifier sequence corpus generator 272, a vector encoder 274, an event type sequence clusterer 276, an automaton generator 278, and the sorter 280 can be entirely hardware, entirely software, or can include both hardware and software elements.

It should be understood that multiple computing devices can be operably linked to form a computer network in a manner as to distribute and share one or more resources, such as clustered computing devices and server banks/farms. In embodiments of the present invention each of the aforementioned elements (e.g., device, medium, source, or module) can be directly or indirectly communicably connected (e.g., via a wireless a wired electronic connection) to at least one other element of the system.

Figure 3:
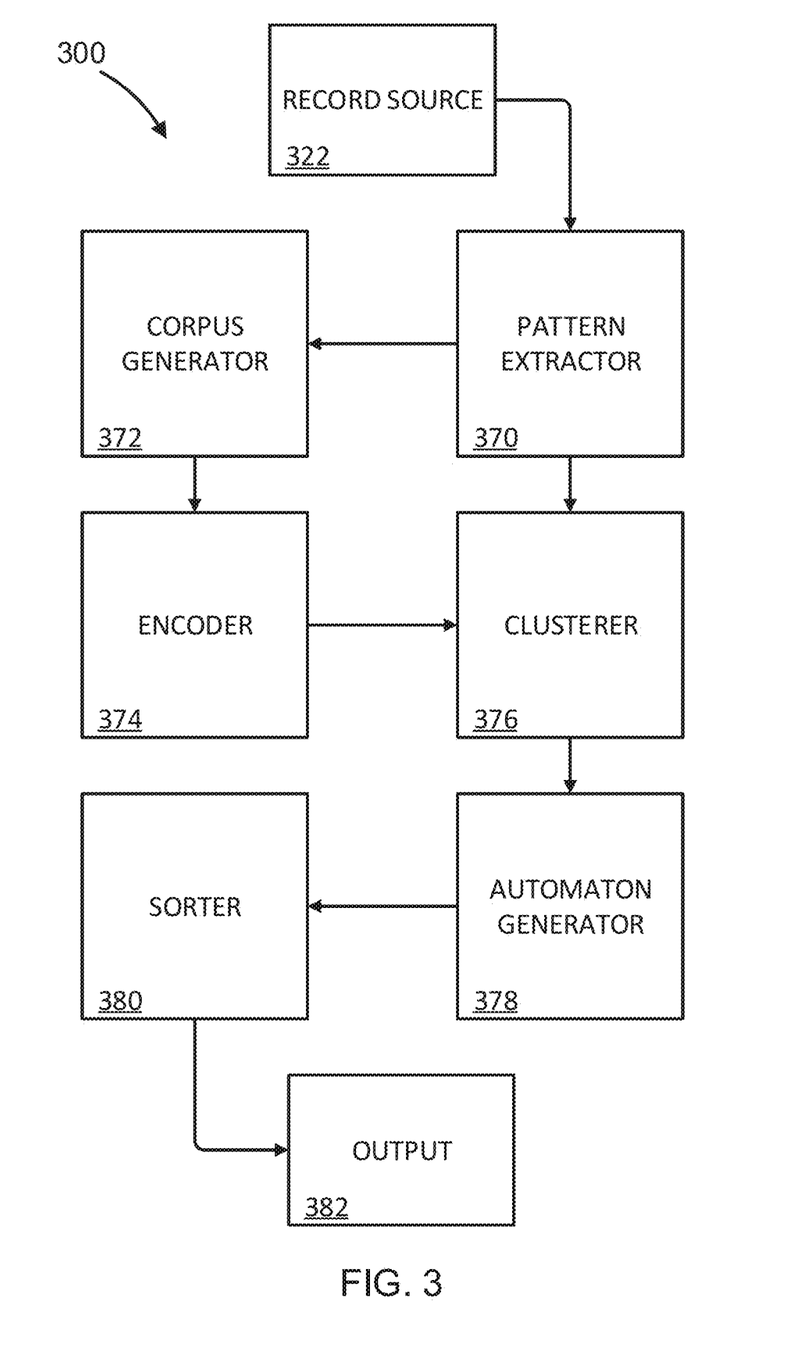
FIG. 3 is a block/flow diagram illustrating a system and method flow in accordance with an embodiment of the present invention.

Referring now to FIG. 3, a block/flow diagram of an embodiment 300 of the present invention is depicted in the context of the cooperation of its constituent elements. In one embodiment the event pattern extractor in block 370 can receive event records (e.g., event sequence records) from the event record log source of block 322 and be configured to obtain unique event patterns from the event records, to map each event record to an identifier which denotes an event type, and to identify failure event patterns therefrom. Embodiments of the invention can also have the corpus generator in block 372 be configured to produce an event corpus (e.g., an event sequence corpus) including a set of identifier sequences. In some embodiments of the present invention have the vector encoder in block 374 can be configured to encode each of the event types identified in the event sequence corpus of block 372 into a d-dimensional vector representation projected onto a d-dimensional metric space. Yet other embodiments have the event type sequence clusterer of block 376 configured to use the vector representations of a plurality of event types from block 374 to group the vector representations into clusters and to retain only those clusters which include representations of failure events that are then passed on to an automaton generator in block 378. A embodiment of the invention has the sorter in block 380 configured to identify the relative temporal order among a plurality of automata generated by the automaton generator of block 378 and to sort the automata in chronological order The system and methods of the various embodiments described herein can be use a variety of ways of communicating and/or transferring data and information, including image and video, over one or more networks or to one or more peripheral devices attached to the system, or to a system module or component. Suitable methods of communication and data transfer can include, but are not limited to, wireless connections, wired connections, cellular connections, data port connections, Bluetooth® connections, near field communications connections, or any combination thereof. One of ordinary skill in the art will appreciate that there are numerous a variety of ways of communicating and/or transferring data and information that can be employed with embodiments of the present disclosure, and embodiments of the present disclosure are contemplated for use with any communications means.

Conventional computer programs include a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium can be internal or external, removable and replaceable, or fixed. It will also be understood that a computing device can include a Basic Input/Output System ("BIOS"), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Embodiments can include a computer program product accessible from a computer-usable or computer-readable medium providing program code for use by or in connection with a computer or any instruction execution system. Any combination of one or more computer readable medium(s) can be employed. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. Illustrative examples of the computer readable storage medium can include the following: an electrical connection having one or more wires, a portable computer diskette, a hard disk, RAM, ROM, an erasable programmable read-only memory ("EPROM" or Flash memory), an optical fiber, a portable compact disc read-only memory ("CD-ROM"), an optical storage device, a magnetic storage device, or any suitable combination of the foregoing. In the context of this document, a computer readable storage medium can be any tangible medium that can contain or store a program for use by or in connection with an instruction execution system, apparatus, or device.

Various embodiments of the present invention include the retrieval of information from a data source (e.g., an event record log source) and storage of information at a storage location, each of which can be a data store. A data store can include one or more of a database, file storage system, relational data storage system or any other data system or structure configured to store data. The data store can be a relational database, working in conjunction with a relational database management system ("RDBMS") for receiving, processing and storing data. A data store can include one or more databases for storing information related to the processing of moving information and estimate information as well one or more databases configured for storage and retrieval of moving information and estimate information.

Each computer program can be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system can also be considered to be embodied in a computer-readable storage medium, configured with a computer program, where the storage medium so configured causes a computer to operate in a specific and predefined manner to perform the steps and other functions described herein.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) can be coupled to the system either directly or through intervening I/O controllers.

Regardless of the type of computer program or computing device involved, a computer program can be loaded onto a computing device to produce a particular machine that can perform any and all of the functions and/or steps depicted or described herein. This particular machine (or networked configuration thereof) provides a technique for carrying out any and all of such functions and steps.

Figure 4:
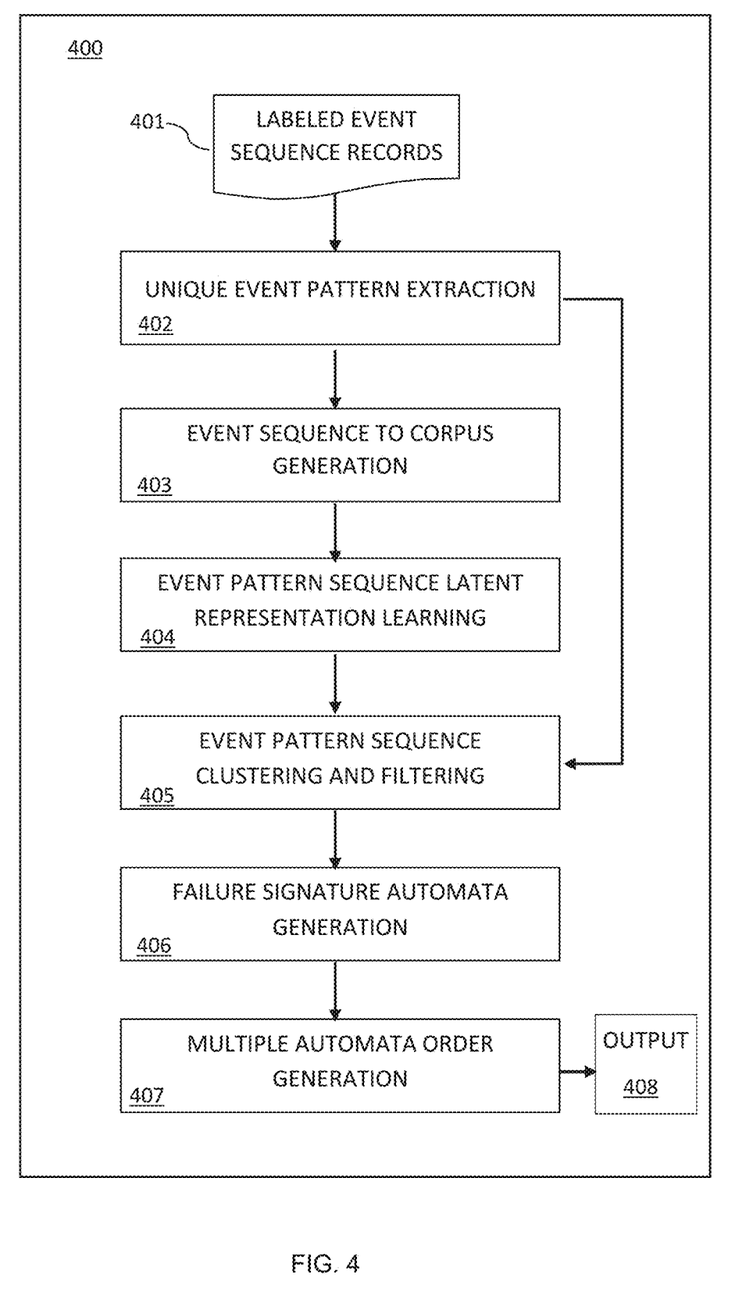
FIG. 4 is a flow diagram illustrating a high-level method for contextual event sequence analysis of system failure, in accordance with an embodiment of the present invention.

In accordance with an embodiment of the present invention depicted in FIG. 4, a method 400 for contextual event sequence analysis of system failure in a computerized system includes obtaining event record logs including a sequence of discrete events 401, identifying patterns within the logs wherein a pattern represents a type of event 402, encoding latent representations of event type sequences 404, generating clusters of failure event types 405, generating an automaton model for each failure cluster 406, and ordering a plurality of automaton models 407. In some embodiments of the present invention, the method can also include generating and recording a sequence of system events in a record log before obtaining event record logs as well as the step of visually presenting 408 (e.g., on a screen) an ordered list of failure event automata. In other embodiments, identifying patterns among the logs can include performing a linear walk along an event sequence.

Referring to FIG. 4 with continued reference to FIG. 3, embodiments of an exemplary method for contextual event sequence analysis of system issues are described. In block 401, one or more discrete event records (e.g., event sequence records), such as records produced by an ICT, a manufacturing plant system, an interconnected sensor system, and the like, can be received or obtained from a record source 322 by pattern extractor 370. In this embodiment, each such record can include time stamps and descriptions of the system events, statuses, or other information related to the operation of the system. As elaborated in more detail below, the event records can be transferred by subsequent steps into the following processes of the various embodiments of the invention via a streaming process, message transporter, file transfer, or other suitable manner. Because subsequently the event records may need to have been labeled, it can be beneficial for portions of the record to be pre-labeled as either pertaining to the system operating normally (e.g., normal state) or pertaining to the system failing to operate properly (e.g., system failure, system fault). However, the labeling can sometimes be permitted to be imprecise and the labels indicating the beginning and end of a failure portion/period can be an imperfect estimate because, in the various embodiments of the present invention, subsequent steps will more specifically identify the beginnings and ends of failure periods, in part, by filtering out common event records in both normal and failure periods.

An exemplary set of discrete event records contemplated for use with the various embodiments of the present invention produced from a log management component which monitors hardware server health status can take the following form:

2016/03/18 18:01:46 unix: [ID 608654 kern.notice]
2016/03/18 18:01:46 panic cpu16/thread=ffffff0003ea3c60: k_fatal 0x0212C000
2016/03/18 18:01:46 genunix: [ID 655072 kern.notice] ffffff0003ea3c50 unix:thread_start+8 ( )
2016/03/18 18:01:46 unix: [ID 100000 kern.notice]

As can be seen in this exemplary set, each record includes a time stamp and an event description. The second record corresponds to a failure, but it is embedded among event records corresponding to normal operation of the system. Accordingly, comprehensive failure diagnosis can be improved with a contextual analysis of event record sequence because individual failure records do not convey a holistic view of the system failure. By using failure event records together certain records appearing in both normal and abnormal scenarios in the formation of such events' sequence order, the method in accordance with an embodiment of the present invention is able to describe the features of a system failure in different phases of a system's operation and the failure's evolution through time.

Because the event records include different categories of events, the process of extracting event patterns 402 in the method according to the embodiment depicted in FIG. 4 includes obtaining unique event patterns to categorize them into categories of unique event patterns/types (hereinafter event "pattern" and event "type" may be used interchangeably). These patterns can be extracted from the records themselves or obtained from elsewhere (e.g., a known set of record types created by a software platform). For example, in a cloud computing system using a cloud management platform, the event records can have types of events such as "system boot", "starting instance", "compute instance" as well as other unique types of event that can be obtained through the domain knowledge of the underlying system or platform. Alternatively, in other embodiments of the present invention, these patterns can be automatically extracted through unsupervised machine learning techniques. Therefore, as part of the process 402, once the unique event patterns are obtained, each event record is mapped to an identifier which denotes its event type. In this manner, a sequence of event records is translated into a sequence of identifiers of event types for ease of computation and manipulation in the subsequent steps of the exemplary method. In some embodiments, the process 402 performed by pattern extractor 370 can also include performing comparative study across normal and failure periods of system operation (with the event sequences transformed into identifier sequences serving as the input) to produce a set of event patterns/types which only exist during system failure periods. This set of event types can be denoted as the set of seed failure event types and can serve as the input in the corpus generation 403 described in more detail below.

Figure 5:
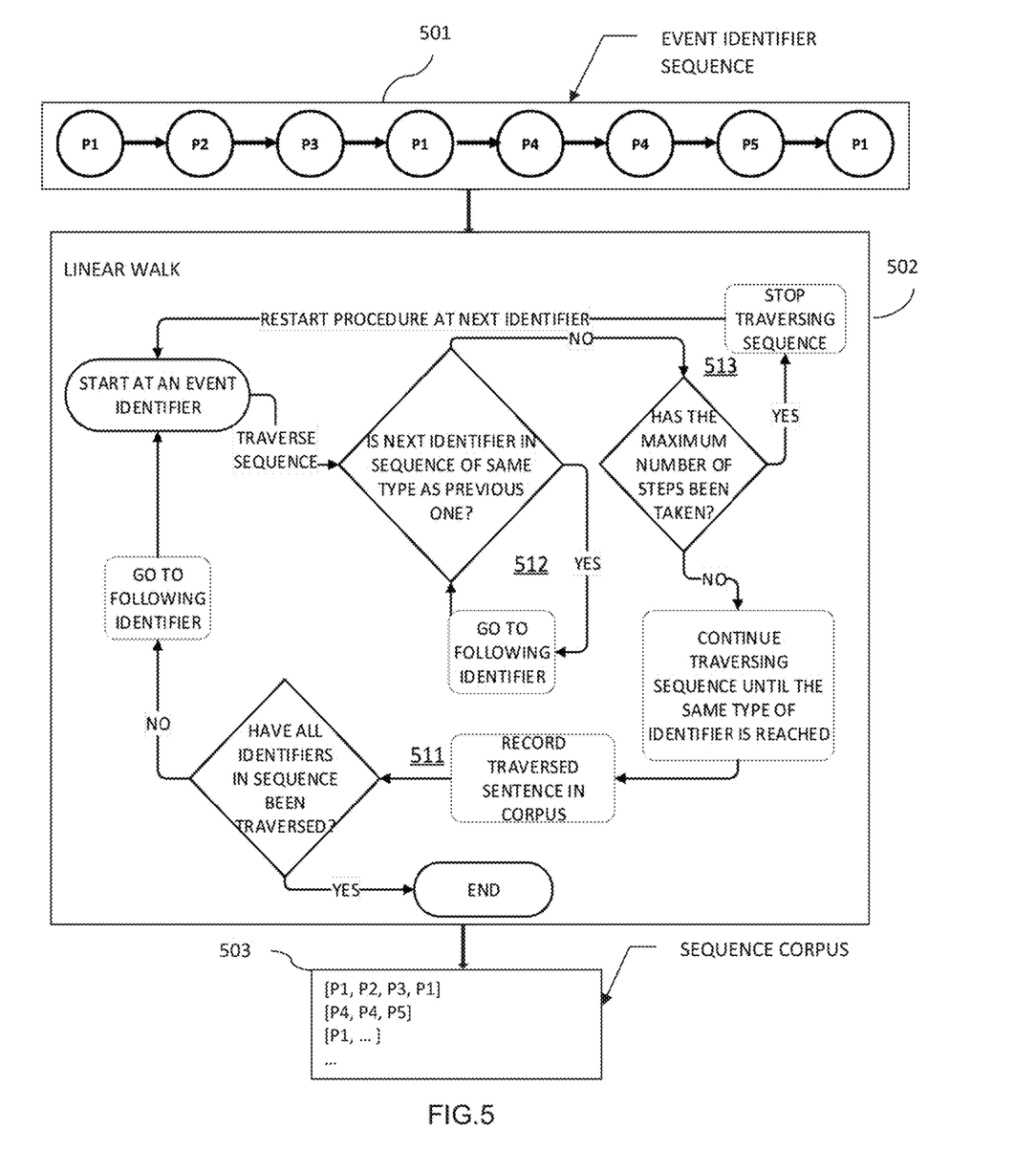
FIG. 5 is a block and flow diagram illustrating the creation of an identifier corpus in accordance with an embodiment of the present invention.

Referring now to FIG. 5 with continued reference to FIG. 3, the process of generating 403 an event corpus can be performed via a corpus generator 372. This process includes taking an event identifier sequence 501 as an input and producing event corpus 503 composed of multiple sequences (analogous to sentences) of identifiers wherein a sentence represents a sequence of identifiers (analogous to words). In one embodiment, each identifier sequence (sentence) is generated by starting from any event pattern in the original sequence and performing a linear walk 502. In accordance with this embodiment of the present invention, the detailed procedure of event corpus generation can be include performing the following routines: For each event identifier in the sequence, perform routine 511—Start walking/traversing from each event identifier and end the walk when the same identifier is reached; perform routine 512—If the same identifier type appears immediately, then walk until a different identifier type is obtained; and perform routine 513—If the same identifier type is not found within a predefined number of walk, then stop the walk and restart routine 511 from the next identifier; then end the linear walk once the procedure covers all event identifiers in the sequence. According to this exemplary corpus generation procedure, two event identifiers can belong to the same cluster if one can walk from the first event identifier to the second by a predetermined "sufficiently small" step (e.g., a step one event identifier long, a step two event identifiers long) which can be defined as the minimum traversal distance between event identifiers along an event identifier sequence. In the context of fault diagnosis, if two failure event patterns or any combination of normal event patterns and failure event patterns appear within a short traversal distance of each other, then such patterns can be clustered together as described in more detail below. Thus, in this embodiment, each subsequent element in the corpus 503 represents a different event identifier sentence as shown in FIG. 4.

Figure 6:
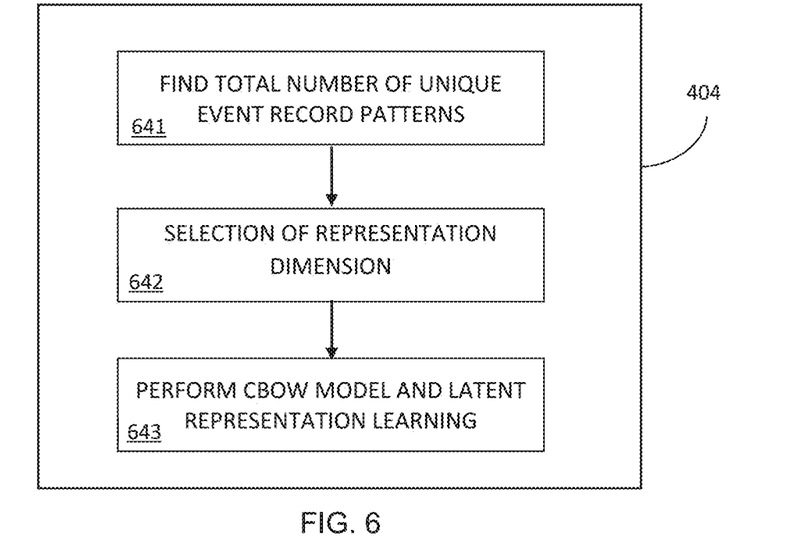
FIG. 6 is a flow diagram illustrating the steps of latent representation encoding and learning in accordance with an embodiment of the present invention.

Referring now to FIG. 6 with continued reference to FIG. 3, in some embodiments, the latent representation 404 can include encoding and learning latent representations of the event sequence types via encoder 374. In this process of latent representation, the sequence corpus 503 output from corpus generator 372 can be taken as an input and the event types of the corpus 503 can be projected into a d-dimensional metric space. In accordance with this embodiment of the present invention, each event type can be represented by a d-dimensional vector with real values. This latent representation encodes information about how the event identifier types are related based on the sequence corpus 503. The sequence information can represent the contextual knowledge of different event record identifier types, which relates to the details of event pattern flow for system failures. In some embodiments, the dimension number d can be selected to be less than the number of unique event identifier types in the corpus 503. Encoder 374 executes a Continuous Bag-of-Words ("CBOW") model to learn the d-dimensional representations. As shown FIG. 6, in some embodiments, the process of latent representation 404 can include finding the total number of patterns/types 641, selecting dimensionality of representations 642, and learning the latent representation 643, each of which are more specifically discussed below.

Finding the total number of unique event record patterns 641 can include obtaining unique event record patterns from record source 322 as well as sorting and removing duplicates from the output of the extraction process 402. Consequently, the latent representation process 404 can include selecting in block 642 the total number of unique event record patterns which is found in block 641 as the maximum number of dimensions d to represent the token event types. It should be understood by one skilled in the art that, in ICT, manufacturing plant, and similar systems, this maximum number is limited because there are only finite numbers of different event record patterns. Because this embodiment of the invention employs dense representation (by removing all the "0" values in the vector representations) for fault diagnosis purposes, the number of representation dimensions is much smaller than the total number of unique event record patterns. Generally, although other values can be used as well, any value between 100 and 300 can be a suitable number of dimensions for the latent representation of event record types.

Some embodiments can have the latent representations of event type sequences 404 further include CBOW modeling 643 to capture contextual information among different event types, using the average d-dimensional vector representation of an event type within a set context window to predict proximate event types based on the contextual information; and refining the representations until each representation correctly predicts an event type given a set of context event types. Accordingly, encoder 374 of one embodiment, can execute a CBOW model to learn the representation of event record types in a d-dimensional space and capture the contextual information among different event types. In this instance, given an event record type sentence which is composed of a set of event types, the CBOW model can predict each of the event patterns given the contextual event patterns using the average of d-dimensional vector representations of the event types within the context window.

Because averaging dilutes the event pattern ordering and because the model represents the patterns in a continuous d-dimensional space, information regarding the sequential or temporal order of the event types is often not well represented. Therefore, this CBOW model can be a multi-class classification model where the number of classes to be predicted is the same as the total number of unique event patterns. According to one embodiment, as part of the modeling process 643, the model initializes the d-dimensional vectors of all the event patterns uniformly at random and then uses the signal from the prediction stage to refine the initial d-dimensional vector representation (e.g., the model adjusts the weights of the vector representations in such a way so that the model can correctly predict an event pattern given a set of context patterns). For example, given the event pattern sentence $[P_1, P_2, P_3, P_1]$ and a context window of 1, the event pattern identifier $P_1$ should be sufficient to predict $P_2$ given its d-dimensional representation. According to the embodiment, if an attempted prediction is incorrect, the model can move the current d-dimensional representation in the direction which rectifies the loss.

With continued reference to FIG. 3, block 405 of the exemplary method depicted in FIG. 4, can include clustering and filtering the event type sequences in accordance with an embodiment of the present invention. Based on the d-dimensional representation of event records the with the embedded contextual knowledge, a density-based clustering technique can be performed by clusterer 376 by executing a clustering algorithm, such as, but not limited to, a density-based spatial clustering of applications with noise ("DBSCAN") algorithm, to cluster together event types. The parameters in the clustering algorithm can be manually selected or chosen automatically. At the end of this clustering and filtering process 405 only the clusters which include failure event types obtained from extractor 370 are retained. The normal event types serve as context and provide meaningful information about the contextual behavior of failure event types.

Figure 7:
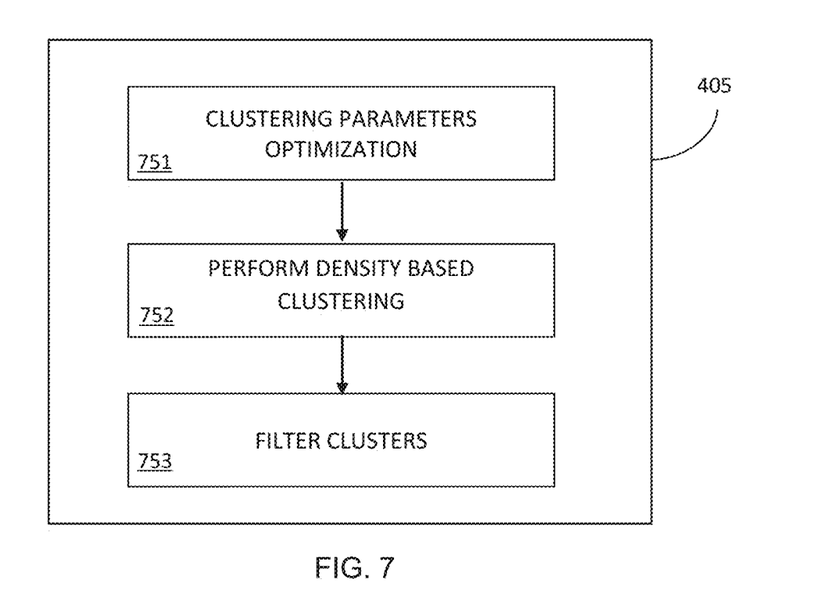
FIG. 7 is a flow diagram illustrating the isolation of failure clusters in accordance with an embodiment of the present invention.

Turning now to FIG. 7 with continued reference to FIG. 4, optimizing the clustering parameters 751, density-based clustering 752, and filtering the clusters 753 are shown as included in the workflow of the clustering and filtering process 405. Because process 405 involves applying a density-based clustering algorithm to automatically group the d-dimensional latent representations of event types from the output of encoder 374, in one embodiment, during the optimizing process 751 the DBSCAN algorithm is selected to be used in in the filtering process 752 because the algorithm does not need the number of clusters to be specified a priori and can find arbitrary shaped clusters. Accordingly, in some embodiments the optimizing process 751 includes selecting a minimum distance parameter which is used to find the neighboring points that can fall into a single cluster. However, since setting a suitable minimum distance parameter in the DBSCAN algorithm can be difficult, a grid search procedure is implemented during optimizing in block 751 by using a Silhouette coefficient as the criterion. It should be understood that the Silhouette coefficient is an internal measure of a cluster which quantifies the quality of generated clustering based on inter-cluster and intra-cluster distance between points. In accordance with this embodiment, the grid search procedure seeks the optimal value by starting from the minimum distance of all pairs of distances among the event types and continuing until the average distance is reached. The value of minimum distance which offers the maximum value of the Silhouette coefficient can be chosen as the optimal value to optimize the clustering parameter.

Having obtained the optimal minimum distance parameter after optimizing 751, density-based clustering 752 is performed with the DBSCAN algorithm. It should be noted that another parameter in the DBSCAN algorithm is the minimum point which specifies the number of event types needed to form a valid cluster. Although various values can be selected for this parameter, according to an embodiment of the present invention, the value is set to be 1 indicating that a single event type can form a cluster if none of the other event patterns fall within the minimum distance threshold.

Once all the clusters for event pattern vectors in the d-dimensional metric space are obtained, the clusters are filtered 753 and only those clusters with failure event types are retained while those with event types pertaining to normal system operation are discarded. These retained clusters ("failure clusters") correspond to different aspects or phases of a system fault or failure.

Figure 8:
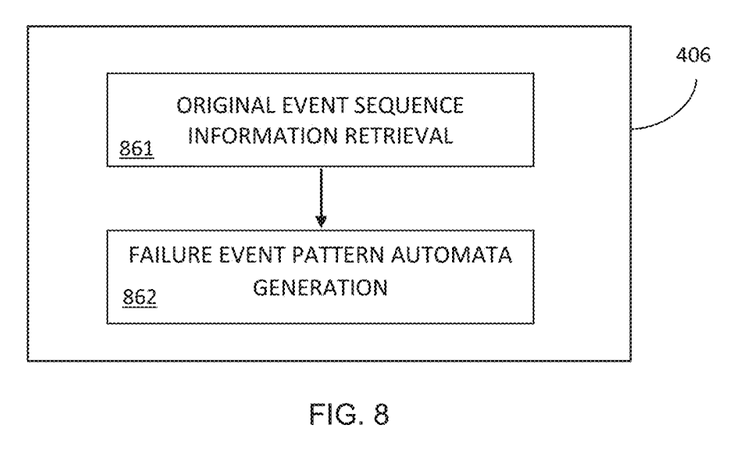
FIG. 8 is a flow diagram illustrating automaton modeling in accordance with an embodiment of the present invention.

As shown in FIG. 8, an exemplary method according to the embodiment of the present invention includes a generation process 406 of failure signature automata. Because the output of the clusterer 376 only include structural information (e.g., information about frequency or proximity) without any temporal context for each individual event type inside each cluster, the original event pattern sequence information obtained from record source 322 can be used as a basis for generating an automaton model in block 406 for each cluster. More specifically, the original event record sequences are retrieved 861 from the original event record information contained in record source 322 for each event pattern in a failure cluster from output by clusterer 376. It should be noted that there could be multiple event record sequences corresponding to the same event type cluster because the same event type order may have occurred multiple times at different locations or points during the operation of a given system. Subsequently, automata for each cluster output from clusterer 376 are produced/generated 862 based on the context of a temporal, sequential, and/or physical order included in the event records (e.g., event identifier pattern sequence records) retrieved 861. Each automaton model describes the event pattern sequence which may have generated the failure. Generating failure event pattern automata 862 includes denoting the automata by creating a node for every event identifier in accordance with an embodiment of the present invention. In one embodiment, if an event identifier $P_y$ appears after an event identifier $P_x$, then a directed link can be generated from $P_x$ to $P_y$. In some cases, a first event type can have multiple directed links coming from it to other event types if the first event type precedes more than one other event type.

Figure 9:
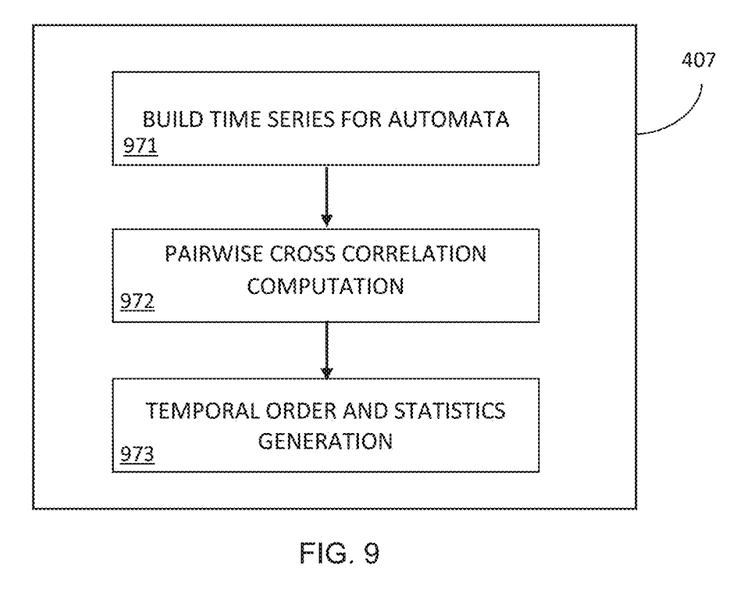
FIG. 9 is a flow diagram illustrating the sorting of event type automata in temporal order in accordance with an embodiment of the present invention.

Although a plurality of automata can be generated 406, the output of generator 378 can lack information regarding the temporal order of the plurality of automata models. The time ordering information of the different automata through time is useful in fault diagnosis because the evolution of the automata illustrates how failure originates and propagates through the fault/failure period. This information provides actionable insights and can help system administrators to understand the potential root causes of a failure and to find the right solution to solve it. Furthermore, the average time lapse statistics is equally important to understand the temporal dynamics of failure propagation. Thus, other embodiments can include temporally ordering 407 a plurality of automaton models by building a time series 971 for each automaton model based on the sequence of discrete events and corresponding time stamps, determining a time delay between pairs of time series within a plurality of time series by performing at least one pairwise cross correlation computation 972, and sorting the time series in a temporal order 973 based on the time delay that maximizes said cross correlation. Therefore, an exemplary method according to an embodiment of the present invention can include ordering the automata in temporal (chronological) or sequential order and generating statistics regarding their propagation.

As shown in FIG. 9 with continued reference to FIG. 3, some embodiments of the present invention include sorter 380 building time series for the automata 971, performing a pairwise cross-correlation computation 972, and generating a temporal order and statistics 937 for the automata. In block 971, each automaton model is mapped back to its corresponding original event record sequence and the corresponding time stamps are extracted. Then, the time sequences are converted into time series by counting the event record occurrences within a given time window. In one embodiment, the time window size can be set to be the smallest interval between any two consecutive event records so as to obtain the finest granularity of statistics information for fault diagnosis. Thus, the process of building a time series 971 results in a plurality of time series with one for each corresponding automaton model. Thereafter, a pairwise cross correlation is computed 972 among the time series from the building process 971. According to one embodiment, the calculation is governed by the following: given a pair of time series x(i) and y(i), the cross correlation can be defined as $C(\tau)=1/N\Sigma_{i=1}^{N}x(i)y(i+\tau)$ where $\tau$ is the time delay factor and N is total number of samples. As a result of this computation 972, a total of K(K−1)/2 pairwise cross correlation outputs are generated where K is number of total automata models. From these results, the smallest absolute value of $\tau$ is found that maximizes the cross-correlation output for each cross-correlation computation to generate a temporal order and statistics in block 973. In accordance with this embodiment, the order of any two time-series is determined by the positive or negative sign of r and the absolute value of $\tau$ is also the time interval statistic of two automata models (e.g., delay between the automata models).

Once the computation procedure 972 is completed for all cross-correlation results, the time series based are sorted in time order 973 based on the on the pairwise ordering information. Therefore, all of the failure event pattern automata models can be ordered chronologically and thereby provide informative failure propagation insights. Optionally, referring to FIG. 4 with continued reference to FIG. 2, in block 408 of the present invention, the ordered results and other statistical information can be output in a manner perceivable by a user or operator of the system (e.g., via textual or graphical representations on a display 262). Alternatively process 408 can involve translating the ordered set of automata and statistical information into other visual or auditory outputs (e.g., via speaker 264). These results and outputs can help system administrators understand where the fault originated and how the fault propagated through time.

Embodiments of the present invention provide the advantages of automatically extracting meaningful clusters of discrete event sequences which can relate to issues in system operation or different stages of system failure as well as of identifying the time and execution order of each failure signature cluster with automaton representations to describe the internal mechanism of failure events. Moreover, the embodiments can organize multiple failure event signatures to form a complete description or depiction of system failure to provide informative and actionable insights to system administrators for failure diagnosis via fast and automated computation without much user intervention except for providing an initial set of records for normal and abnormal system events.

Embodiments described herein can be entirely hardware, entirely software or including both hardware and software elements. In one embodiment, the present invention is implemented in software, which includes but is not limited to firmware, resident software, microcode, etc.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

Program code embodied on a computer readable medium can be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof can be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions can include computer executable code. A variety of languages for expressing computer program instructions are possible, including without limitation C, C++, JAVA™, JAVASCRIPT™, assembly language, LISP™, HTML, PERL™, and so on. Such languages can include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads can be processed more or less simultaneously to enhance utilization of the processor and to facilitate substantially simultaneous functions. By way of implementation, any and all methods, program codes, program instructions, and the like described herein can be implemented in one or more thread. The thread can spawn other threads, which can themselves have assigned priorities associated with them. In some embodiments, a computing device can process these threads based on priority or any other order based on instructions provided in the program code.

The functions, systems and methods herein described could be employed and presented in a multitude of languages. Individual systems can be presented in one or more languages and the language can be changed with ease at any point in the process or methods described above. One of ordinary skill in the art would appreciate that there are numerous languages the system could be provided in, and embodiments of the present disclosure are contemplated for use with any language.

While various embodiments of the present invention have been disclosed and described in detail herein, it will be apparent to those skilled in the art that various changes can be made to the configuration, operation and form of the invention without departing from the spirit and scope thereof. In particular, it is noted that the respective features of embodiments of the invention, even those described solely in combination with other features of embodiments of the invention, can be combined in any configuration excepting those readily apparent to the person skilled in the art as nonsensical. Likewise, use of the singular and plural is solely for the sake of illustration and is not to be interpreted as limiting.

The foregoing is to be understood as being in every respect illustrative and exemplary, but not restrictive, and the scope of the invention described herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:
1. A computer system for contextual event sequence analysis of system operation, comprising:
    a processor device; and
    a memory device operatively coupled to the processor device, the memory device configured to serve as an event record log source including digital event record logs, the processor device configured to execute program code stored on the memory device to:
extract patterns from event records using an event pattern extractor;
generate an event corpus from the extracted event patterns using an event identifier corpus generator;
execute a machine learning algorithm to learn encoded latent representations of sequences of event types using a vector encoder coupled to the corpus generator;
generate clusters of events using an event type sequence clusterer;
generate automaton models of events ordered based on a context of events obtained from retrieved event records for the clusters using an automaton generator; and
identify issues in the operation of a system using the automaton models to resolve the issues by locating a source of each issue and preventing propagation of the issue through the system.

2. The system as recited in claim 1 further comprising at least one of a visual output device or an audio output device.

3. The system as recited in claim 1, wherein the event pattern extractor is configured to obtain unique event patterns from the event records, to map each event record to an identifier which denotes an event type, and to identify failure event patterns.

4. The system as recited in claim 1, wherein the corpus generator is configured to generate an event corpus having a set of identifier sequences.

5. The system as recited in claim 1, wherein the vector encoder is configured to encode each of the event types identified in the event corpus into a d-dimensional vector representation projected onto a d-dimensional metric space.

6. The system as recited in claim 1, wherein the event type sequence clusterer is configured to use the vector representations of a plurality of event types to group the vector representations into clusters and to retain only those clusters which include representations of failure events.

7. The system as recited in claim 1, wherein the automaton generator is configured to generate automaton model for the clusters based on information originally included in the event records, including the generation of a node for every event identifier in the retrieved event records, where a directed link is generated from event $P_x$ to event $P_y$ for events $P_y$ that occur after event $P_x$.

8. The system as recited in claim 1, further including a sorter, wherein the sorter is configured to identify a relative temporal order among a plurality of automaton models generated by the automaton generator and to sort the plurality of automaton models in chronological order.

9. A computer program product comprising a non-transitory computer readable medium including instructions executable by a computer system instructing the system to:
identify patterns within event record logs wherein a pattern represents a type of event;
generate a corpus of event types;
encode latent representations of event type sequences;
learn latent representations of event type sequences;
generate clusters of failure event types;
generate an automaton model based on a context of events obtained from retrieved event records for each failure cluster; and
order a plurality of automaton models.

10. The computer program product as recited in claim 9 further comprising a non-transitory computer readable medium including instructions executable by a computerized system instructing the system to present an ordered set of automata on a display.

11. A method for contextual event sequence analysis of system operation in a computerized system, comprising:
identifying patterns within event record logs wherein a pattern represents a type of event;
generating a corpus of event types;
encoding latent representations of event type sequences;
learning latent representations of event type sequences;
generating clusters of event types;
generating an automaton model for each cluster; and
identifying issues in the operation of a system using the automaton models to resolve the issues by locating a source of each issue and preventing the propagation of the issue through the system.

12. The method as recited in claim 11, further comprising generating and recording a sequence of system events in a record log.

13. The method as recited in claim 11, further comprising visually presenting an ordered list of failure event automata.

14. The method as recited in claim 11, wherein identifying patterns within the event record logs further includes performing a linear walk along an event sequence.

15. The method as recited in claim 11, wherein encoding latent representations of event type sequences includes:
finding the total number of unique event record types by removing duplicates from all of the event record types;
retaining only unique event record types;
projecting the unique event record types into a d-dimensional metric space; and encoding each unique event record type as a d-dimensional vector.

16. The method as recited in claim 11, wherein learning latent representations of event type sequences includes:
performing Continuous Bag-of-Words modeling to capture contextual information among different event types;
using an average d-dimensional vector representation of an event type within a set context window to predict proximate event types based on the contextual information; and
refining the representation until the representation correctly predicts an event type given a set of context event types.

17. The method as recited in claim 11, wherein generating failure event clusters includes:
clustering all unique event types via a density-based clustering algorithm; and
filtering clusters of said unique event types to retain only failure event type clusters.

18. The method as recited in claim 17, wherein generating an automaton model for each cluster includes:
retrieving at least one sequence of discrete events; and
generating an event automaton for each of the retained clusters based on the at least one sequence of discrete events.

19. The method as recited in claim 11, further including temporally ordering a plurality of automaton models, the ordering of the plurality of automaton models including:
building a time series for each automaton model based on the sequence of discrete events and corresponding time stamps;
determining a time delay between pairs of time series within a plurality of time series by performing at least one pairwise cross correlation computation; and
sorting the time series in a temporal order based on the time delay that maximizes said cross correlation.

20. The method as recited in claim 19, wherein building a time series for each automaton model includes counting event record occurrences within a set time window.

\* \* \* \* \*